July 15, 1952 L. O. FUNDINGSLAND 2,603,137
CLUTCH MECHANISM FOR ROD WEEDER ATTACHMENTS
Filed June 10, 1949
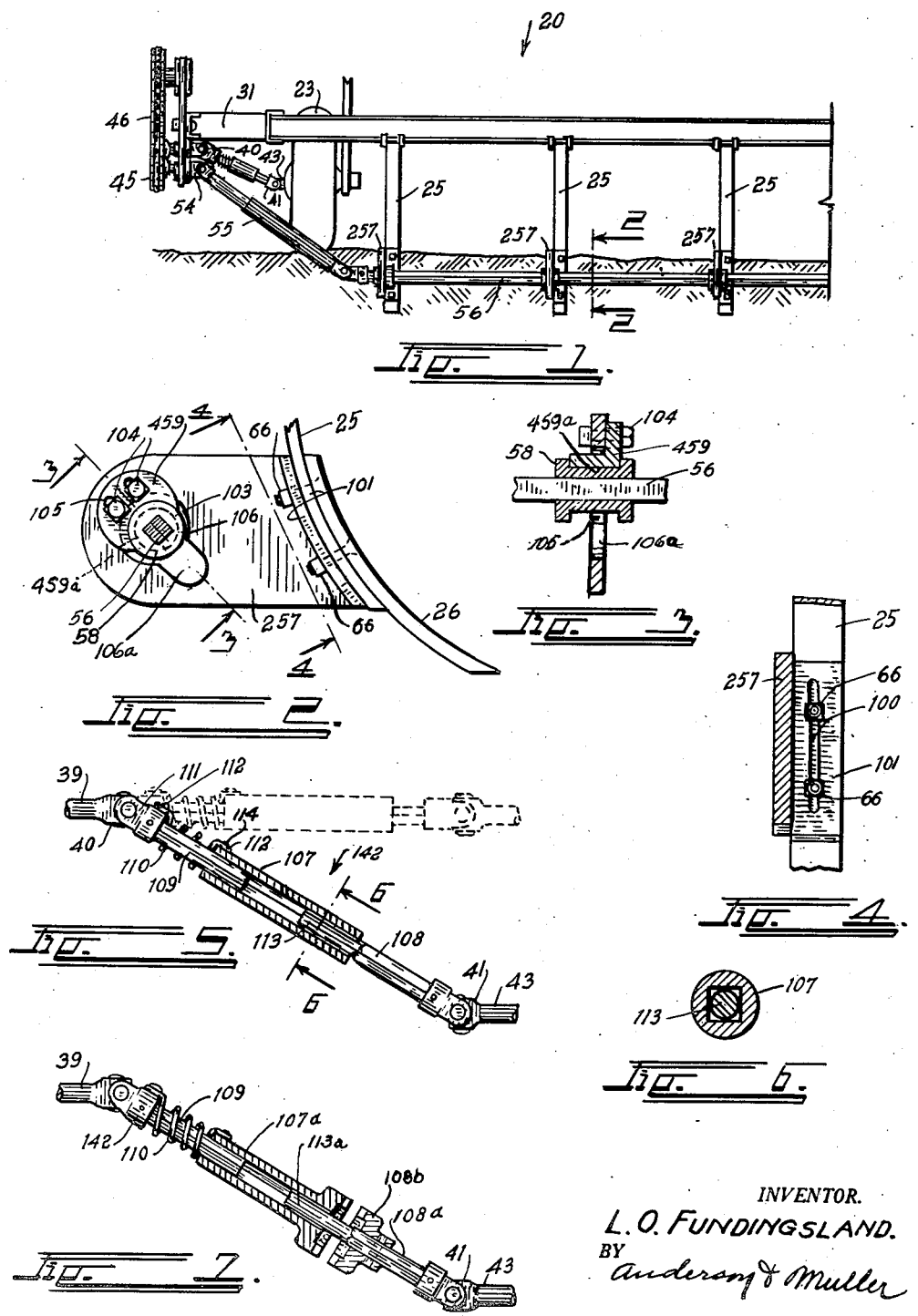
INVENTOR.
L. O. FUNDINGSLAND.
BY
Anderson & Muller
ATTORNEY.

Patented July 15, 1952

2,603,137

UNITED STATES PATENT OFFICE 2,603,137

CLUTCH MECHANISM FOR ROD WEEDER ATTACHMENTS

Laurence O. Fundingsland, Denver, Colo.

Application June 10, 1949, Serial No. 98,317

2 Claims. (Cl. 97—42)

This invention relates to agricultural implements and more particularly to a rod weeder attachment for chisel plows, the present application being a continuation-in-part of my application Serial No. 46,694 filed August 28, 1949, now Patent 2,528,270.

In the above identified application I have disclosed a conventional chisel plow to one end of which is secured a power take off attachment, driven by one of the supporting wheels, suitable mechanism being provided to drive an elongated weeder rod rotatably supported by the chisels. It has been found that under certain conditions of operation, in certain types of soil the weeder rod binds to some extent in its supporting bearings which creates unnecessary load and wear on the driving mechanism. It has also been found that under certain conditions of adjustment of the machine the driving wheel may be automatically clutched to the mechanism on the attachment.

One of the objects of the invention is to provide a weeder rod attachment for plows wherein the weeder rod supporting structure eliminates binding of the weeder rod in its bearings when the chisels are deflected by striking obstructions or soil conditions which flexes the chisels to varying extent.

Another object is to provide a weeder rod attachment for plows wherein a clutching device automatically establishes a driving connection to a supporting wheel when the machine is placed into operation after having adjusted the elevation of the frame relative to the ground.

Still further objects, advantages, and salient features will become more apparent from a consideration of the description to follow, the appended claims, and the accompanying drawing, in which:

Figure 1 is a rear elevation of a portion of the chisel plow, this figure being substantially the same as Figure 3 of the identified copending application, except for the improvements which form the subject of this invention.

Figure 2 is an enlarged section taken on line 2—2, Figure 1;

Figure 3 is a section taken on line 3—3, Figure 2;

Figure 4 is a section taken on line 4—4, Figure 2;

Figure 5 is a rear elevation, partly in section, of a clutching mechanism, this figure being similar to Figure 18 of the identified copending application, except for the improvements which form the subject of this invention;

Figure 6 is a section taken on line 6—6, Figure 5; and

Figure 7 is an alternative form of the construction shown in Figure 6.

Referring in detail to the drawing wherein like reference numerals represent like parts and also certain parts disclosed in the identified copending application, a conventional chisel plow 20 is supported at its ends, by wheels, a wheel at one end being indicated by reference character 23. This frame supports a plurality of pendents 25 which have chisels 26 at their ends adapted to move below the surface of the ground. A weeder rod 56 is journaled on these pendents in a manner to be more fully described hereinafter, and is driven from wheel 23 through shaft 43, universal joint 41, extensible shaft 142, universal joint 40, shaft 39, sprockets and chains 45, 46, shaft 54, and extensible propeller shaft 55, all as more fully described in my above identified copending application. The points of novelty over said application will now be described.

Pendents 25 each support a bracket 257, by a pair of bolts 66 which extend through suitable holes in each pendent and an elongated slot 100 in an end flange 101 on the forward end of each bracket. The rear end of each bracket is provided with a large circular hole 103 in which is disposed a spool 58, this spool having flanges at its ends as clearly shown in Figure 3. A bearing plate 459 having a semicircular wearing surface 459a abuts the spool 58 between the flanges, this plate being adjustably secured to bracket 257 by bolts 104 which pass through enlarged or elongated openings 105 in bracket 257. Enlarged or elongated openings may also be employed in bearing plate 459, if desired, or in both the bearing plate and bracket. When the bearing plate is in the desired position of adjustment there is a space 106 between the spool 58 and bracket 459 which performs an important function which will now be described.

When the frame 20 is moved over the ground the weeder rod is rotating below the surface thereof, as shown in Figure 1. The pendents 25 are resilient hence when one or more of the chisels strikes an obstruction, or ground which offers uneven resistance to the chisels, one or more of the pendants spring rearwardly. If the spools were journaled to move with the pendents as they spring rearwardly it will now become apparent that the weeder rod would cause one or more of the spools to bind. This is obviated by the present invention since bracket 257 and bearing plate 459 is free to move rearwardly when the pendent springs rearwardly, the spool remaining in the same position relative to frame 32. In other words, the bearing plate 459 temporarily disengages the spool, a forward and lower portion of plate 257 adjacent opening 103 moving into space 106. The space 106 may be enlarged as desired, such as shown by slot 106a, depending upon the particular soil and amount of spring of the pendents. Slot 106a is narrower than the diameter of the spool flange which permits the slot to move over the spool hub but prevents the spool from moving endwise on the weeder rod. When the obstruction has been passed the bearing plate 459 returns into engagement with the rearward and upper portion of the spool, as shown in Figure 2.

Another feature which differs from the identified copending application is the extensible shaft 142 shown in Figure 5. This shaft is similar to that shown in Figure 18 of said application but differs in that a sleeve 107 having a non-circular bore, such as a square hole, is disposed between square shaft 108 and universal joint 40. This sleeve slides on a square shank 109 and a spring 110 is interposed between one end of the sleeve and the portion 111 of the universal joint, one end of the spring being secured to portion 111 and the other to the sleeve by any suitable means such as eyes 112, the eyes being secured to sleeve 107 and portion 111, respectively, by screws, or the like, 114. Welding or any other securing means may, of course, be employed.

Assuring now that the frame 32 has been raised to a certain position above the ground where the square shaft 108 has disengaged from the sleeve, as shown by full lines in Figure 5, circular end 113 of this shaft rotates in the square hole and parts 107, 109, and the remaining drive mechanism to the weeder rod is stationary. This is desired when the chisel plow is being towed from one field to another to obviate unnecessary wear on the driving mechanism on attachment 31 and also wear on the spools 58, bearing plates 459 and other moving parts of the mechanism. When it is again desired to rotate the weeder rod, frame 32 is lowered. If the frame is stationary at this time it is apparent that square shaft 108 would not enter the sleeve 107 unless the square shaft and square hole happened to be in alignment. With the present invention it is immaterial whether or not these parts are in alignment and clutching will automatically take place when the machine is again towed, the operation being as follows: If the shaft 108 is misaligned with the hole in the sleeve 107 it forces the sleeve toward the universal joint 40 against the urge of spring 110. When shaft 108 is rotated due to movement of the chisel plow over the ground it will come into alignment with the square hole at which time spring 110 forces sleeve 107 away from the universal joint and it automatically comes into driving engagement with shaft 108.

In Figure 7 is disclosed an alternative form of the construction disclosed in Figure 5. In this construction toothed or "dog" clutch 108b is fixed to shaft 108a, the latter having a pilot end 113a which may rotate in sleeve 107a. Sleeve 107a has similar teeth which engage with the teeth on the face of clutch 108b. Sleeve 107a has a square hole which engages portion 109, as previously described, the spring 110 also being disposed in the same relative position. This construction operates in the same manner previously described as will be apparent.

Many modifications of the invention will now become apparent within the spirit thereof. For example, the weeder rod brackets 257 may be so constructed that the weeder rod is in any desired position relative to the chisels and other means will become apparent which permit distortion of the pendents without distorting the weeder rod. Also, other clutch devices may be interposed between the drive wheel and attachment support. It is not intended, therefore, to limit the invention to the precise details illustrated, except as defined by the scope of the appended claims.

What I claim as new is:

1. In a wheel supported chisel plow of the class wherein the frame which carries the chisels is adjustable substantially vertically with respect to the wheels, an attachment support affixed to said frame at one end thereof, journal means on said chisels supporting a weeder rod extending transversely of the chisels, rotatable means on said support, means drivingly connecting said rotatable means to one end of said weeder rod, and extensible shaft means drivingly connecting said rotatable means to a wheel of said chisel plow, the improvement wherein said last named means includes a clutch device interposed between the ends thereof having a pair of clutch members adapted to be automatically disconnected from driving engagement in one position of vertical adjustment of the frame, the extensible shaft means being adapted to shorten in length with the clutch members out of operative clutching engagement when the frame is lowered to a position wherein the clutch members would normally be in clutching engagement and with the wheel stationary, and resilient means adapted to urge one of the clutch members toward the other clutch member for effecting automatic engagement of the clutch members upon rotation of the wheel relative to said rotatable member after the frame is lowered to said position.

2. In an attachment for use with a wheel supported plow of the class comprising an elongated frame supported by wheels adjacent its ends, the frame being bodily movable substantially vertically with respect to the wheels and carrying a plurality of spaced plow members projecting rearwardly thereof, said attachment comprising; a support adapted to be affixed to the frame at one end to form an extension thereof, a rotatable member journaled on said support, journal members adapted to be attached to the plow members, a weeder rod rotatably supported by said journal members, means drivingly connecting said rotatable member to one end of said weeder rod, a flexible drive member comprising a pair of shafts, each having a universal joint at one end thereof, one of the universal joints being connected to said rotatable member and the other universal joint adapted to be drivingly connected to the wheel adjacent the support, when the latter is affixed to the frame, and clutch means on one of the shafts, the improvement comprising; a member slideable on and non-rotatably connected to the other shaft having clutch means engageable with the first clutch means, resilient means urging the second clutch means toward the first clutch means adapted to automatically engage the two clutch means when one shaft rotates relative to the other shaft, journal members adapted to be attached to the plow members, a weeder rod rotatably supported by said journal members, and means drivingly connecting said rotatable member to one end of said weeder rod.

LAURENCE O. FUNDINGSLAND.

REFERENCES CITED

The following references are of record in the file of this patent:

UNITED STATES PATENTS

| Number | Name | Date |
| --- | --- | --- |
| 1,985,168 | Heinze | Dec. 18, 1934 |
| 2,332,617 | Tuft et al. | Oct. 26, 1943 |
| 2,355,229 | Miller | Aug. 8, 1944 |
| 2,514,442 | Calkins | July 11, 1950 |
| 2,528,270 | Fundingsland | Oct. 31, 1950 |